(12) United States Patent
Okada

(10) Patent No.: US 10,054,760 B2
(45) Date of Patent: Aug. 21, 2018

(54) ZOOM LENS BARREL AND OPTICAL APPARATUS USING THE SAME

(71) Applicant: CANON KABUSHIKI KAISHA, Tokyo (JP)

(72) Inventor: Tadanori Okada, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 160 days.

(21) Appl. No.: 14/984,193

(22) Filed: Dec. 30, 2015

(65) Prior Publication Data
US 2016/0202448 A1  Jul. 14, 2016

(30) Foreign Application Priority Data
Jan. 13, 2015 (JP) ................. 2015-004029

(51) Int. Cl.
*G02B 7/10* (2006.01)

(52) U.S. Cl.
CPC .................. *G02B 7/102* (2013.01)

(58) Field of Classification Search
CPC ... G02B 7/04; G02B 7/09; G02B 7/10; G02B 7/102; G02B 7/105; G02B 15/14–15/28
USPC ....... 359/684, 825, 819, 821, 822, 823, 826, 359/830
See application file for complete search history.

(56) References Cited

U.S. PATENT DOCUMENTS

| 5,689,375 A | 11/1997 | Satoh et al. |
| 6,333,825 B1 | 12/2001 | Hamasaki et al. |
| 2009/0059400 A1* | 3/2009 | Koyama ................ G02B 7/10 359/825 |
| 2012/0075720 A1* | 3/2012 | Iikawa .................. G02B 7/10 359/695 |

FOREIGN PATENT DOCUMENTS

| JP | 2001021789 A | 1/2001 |
| JP | 2001188161 A | 7/2001 |
| JP | 2009151232 A | 7/2009 |
| JP | 2010091884 A | 4/2010 |

* cited by examiner

*Primary Examiner* — Cara Rakowski
(74) *Attorney, Agent, or Firm* — Rossi, Kimms & McDowell LLP

(57) ABSTRACT

A zoom lens barrel comprises: a focus lens frame moves in an optical axis direction (inOAD) during zooming and focusing; a focus cam ring (FCR) rotates to move focus lens frame inOAD; a key member rotates to transmit torque to FCR; a zoom lens frame moves inOAD along with FCR; a zoom cam ring rotates to move zoom lens frame inOAD; a first rotation transmission portion (RTP) provided to FCR; and a second RTP provided to key member to be engaged with first RTP, in which cam grooves formed on zoom cam ring are engaged with rollers provided to zoom lens frame, respectively, focus lens frame moves inOAD when FCR rotates with rotation of key member during focusing, and focus lens frame moves inOAD along with zoom lens frame when FCR rotates with relative position change of first and second RTPs inOAD during zooming.

9 Claims, 7 Drawing Sheets

ZOOM LENS BARREL AND OPTICAL APPARATUS USING THE SAME

BACKGROUND OF THE INVENTION

Field of the Invention

The present invention relates to a zoom lens barrel and an optical apparatus using the same.

Description of the Related Art

A zoom lens barrel to be used for a digital camera, a video camera, or the like serving as an optical apparatus has a mechanism in which a plurality of lens units are moved by a rotation operation of a zoom ring (zoom cam ring) or the like during zooming.

Meanwhile, in a zoom lens barrel of a so-called "rear focus lens" or "inner focus lens", in order to maintain an image forming position during zooming, it is required to appropriately drive a focus cam ring along with rotational driving of the zoom cam ring. In Japanese Patent Application Laid-Open No. 2009-151232, in order to appropriately drive a focus cam ring along with rotational driving of a zoom cam ring, the focus cam ring is engaged not only with a focus key but also with the zoom cam ring.

However, in Japanese Patent Application Laid-Open No. 2009-151232, as the zoom cam ring, in addition to a cam ring to be engaged with a zoom lens frame configured to hold zoom lens units, a cam groove to be engaged with the focus cam ring needs to be formed. Therefore, the number of cam grooves that is proportional to the number of movable units (the zoom lens units and the focus cam ring) is required in the zoom cam ring. As the number of movable units becomes larger, more space for forming the cam grooves is required in the zoom cam ring. Then, as a result, there have been problems in that a length of the zoom cam ring is increased, and that the zoom lens barrel is increased in size in an optical axis direction.

SUMMARY OF THE INVENTION

It is an object of the present invention to provide a zoom lens barrel capable of being downsized by reducing the total length of a zoom cam ring with a simple structure, and an optical apparatus using the zoom lens barrel.

In order to achieve the above-mentioned object, according to one embodiment of the present invention, there is provided a zoom lens barrel, comprising: a focus lens frame configured to move in an optical axis direction during zooming and focusing; a focus cam ring configured to rotate to move the focus lens frame in the optical axis direction; a key member configured to rotate to transmit torque to the focus cam ring; a zoom lens frame configured to move in the optical axis direction along with the focus cam ring; a zoom cam ring configured to rotate to move the zoom lens frame in the optical axis direction; a first rotation transmission portion provided to the focus cam ring; and a second rotation transmission portion provided to the key member to be engaged with the first rotation transmission portion, in which a plurality of cam grooves formed on the zoom cam ring are engaged with a plurality of rollers provided to the zoom lens frame, respectively, and in which the focus lens frame is configured to move in the optical axis direction when the focus cam ring rotates with the rotation of the key member during focusing, and the focus lens frame is configured to move in the optical axis direction along with the zoom lens frame when the focus cam ring rotates with a change in relative position of the first rotation transmission portion and the second rotation transmission portion in the optical axis direction during zooming.

Moreover, an optical apparatus according to one embodiment of the present invention comprises: a camera body; and the above-mentioned zoom lens barrel.

Further features of the present invention will become apparent from the following description of exemplary embodiments with reference to the attached drawings.

DESCRIPTION OF THE EMBODIMENTS

An exemplary embodiment of the present invention is hereinafter described in detail with reference to the attached drawings.

<First Embodiment>

Zoom Lens Barrel

With reference to FIG. 1 to FIG. 15, a zoom lens barrel 50 according to an embodiment of the present invention is hereinafter described.

Figure 1:
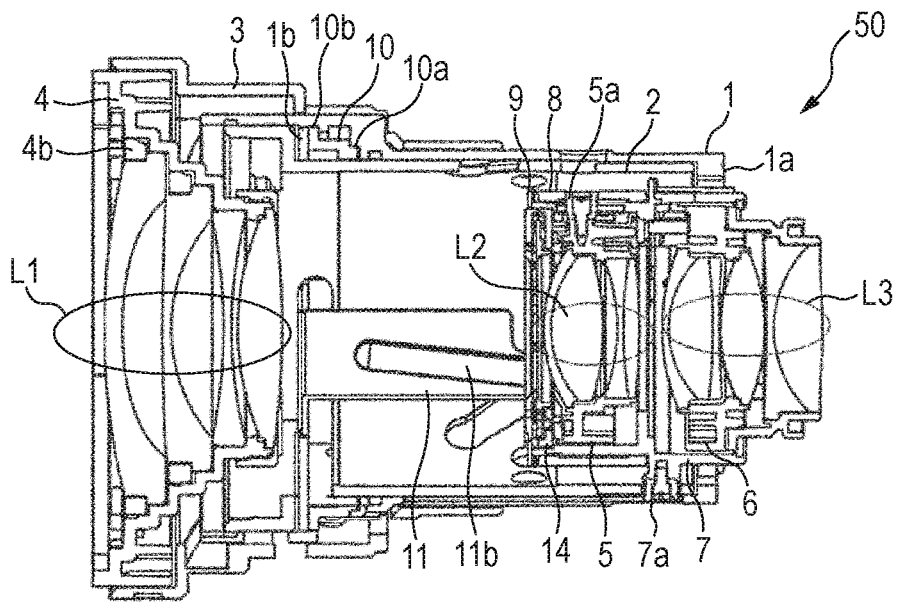
FIG. 1 is a cross-sectional view for illustrating a zoom lens barrel according to an embodiment of the present invention in a wide angle state.
Figure 2:
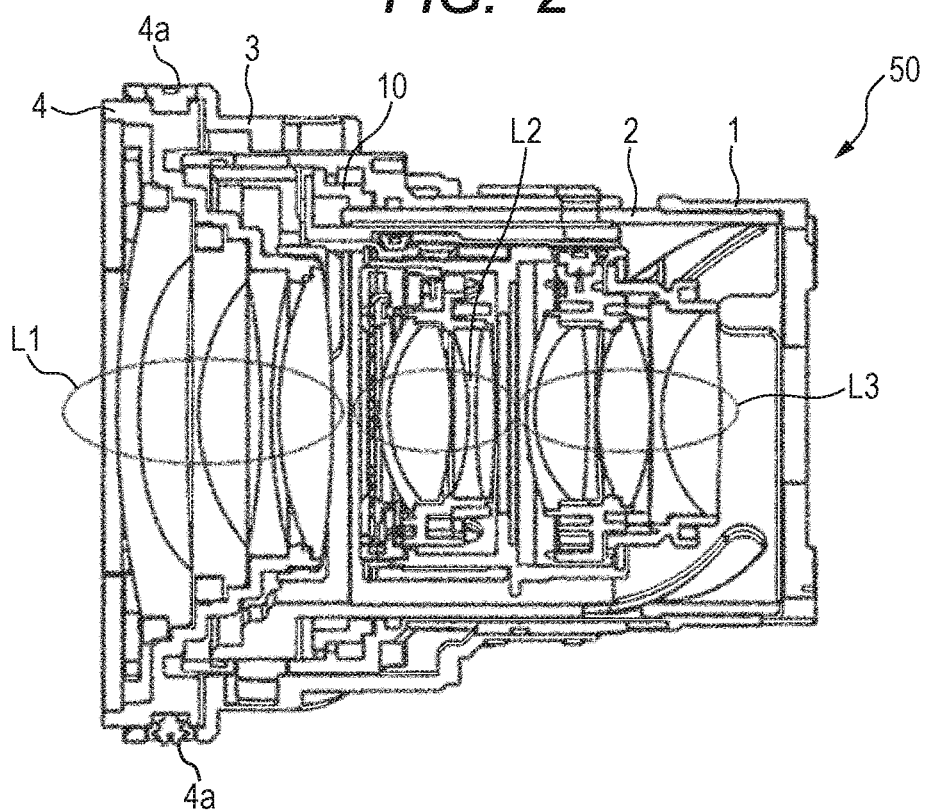
FIG. 2 is a cross-sectional view for illustrating the zoom lens barrel according to the embodiment of the present invention in a telephoto state.
Figure 3:
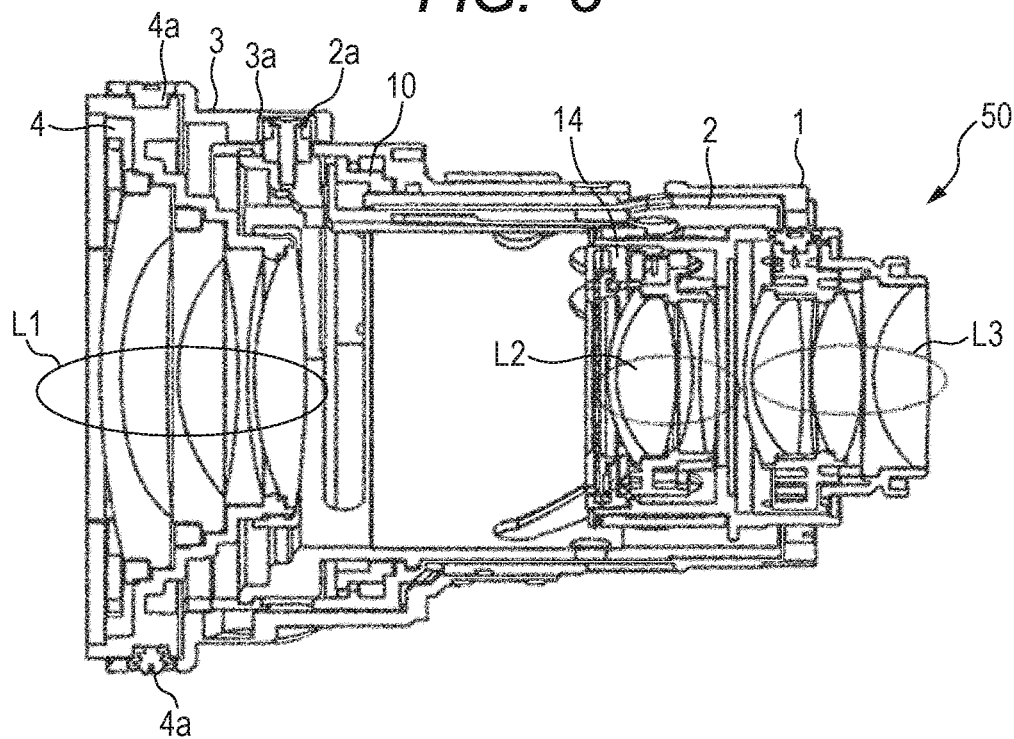
FIG. 3 is a cross-sectional view obtained by cutting the zoom lens barrel of FIG. 1 along a different cross section.
Figure 11:
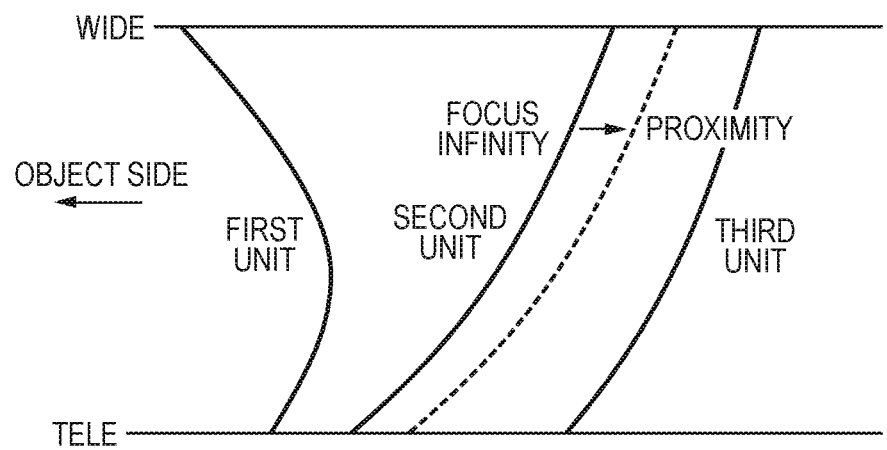
FIG. 11 is a diagram for illustrating movement amounts of respective lens units during zooming in the zoom lens barrel according to the embodiment of the present invention.

In this embodiment, as illustrated in FIG. 1, as lens units in a zoom lens configured to take a still image and a moving image, in order from an object side, a first lens unit L1, a second lens unit L2, and a third lens unit L3 are included. Then, as illustrated in FIG. 11, the second lens unit L2 is configured to move in an optical axis direction during focusing. Moreover, as illustrated in FIG. 11, the first lens unit L1, the second lens unit L2, and the third lens unit L3 are configured to move in the optical axis direction by different movement amounts during zooming (in FIG. 1, the zoom lens barrel 50 according to the embodiment of the present invention at a wide angle state is illustrated, while in FIG. 2, a telephoto state is illustrated).

Action of Zoom Lens Barrel

In this embodiment, as described later in detail, a focus cam ring rotates with a rotation of a key member to move a focus lens frame, which holds the second lens unit L2, in the optical axis direction during focusing. Moreover, when a zoom lens frame is moved in the optical axis direction along with the focus cam ring during zooming, as described later in detail, the focus cam ring rotates with a change in relative position of a first rotation transmission portion and a second rotation transmission portion in the optical axis direction to move the focus lens frame in the optical axis direction.

Specific Structure of Zoom Lens Barrel

Figure 15:
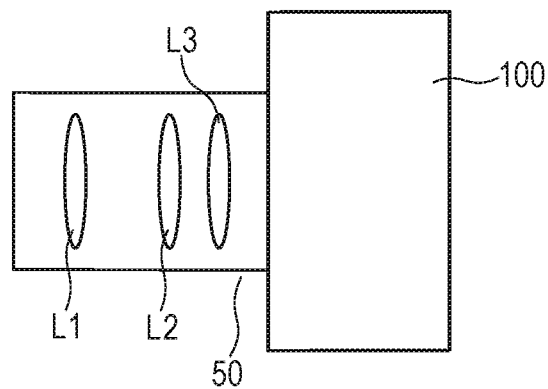
FIG. 15 is a diagram for illustrating a structure of an optical apparatus according to an embodiment of the present invention.

In FIG. 1, a fixed barrel 1 is illustrated, which has a rear end 1a on an image side to be used to fix a mounting member (not shown) for being coupled to a camera body 100, or an exterior member. In other words, as illustrated in FIG. 15, the zoom lens barrel 50 according to this embodiment may be engaged with the camera body 100. A zoom cam ring 2 is used to perform zooming or an operation for zooming, and is held to be rotatable at a fixed position with an inner circumference thereof being fitted to the fixed barrel 1. Note that, in FIG. 1, an electromagnetic stop unit 14 is electrically connected to a drive circuit according to a well-known technology (not shown).

1) In Regard to First Lens Unit L1

Figure 4:
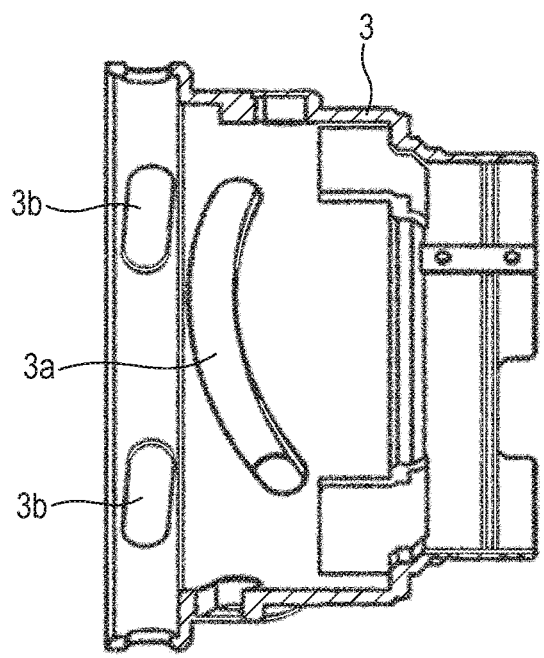
FIG. 4 is a cross-sectional view for illustrating a shape of a straight advance barrel of the zoom lens barrel according to the embodiment of the present invention.

In FIG. 1, a straight advance barrel 3 holds a first lens barrel 4 at a distal end on the object side with rollers 4a. To the first lens barrel 4, the first lens unit L1 serving as a lens unit is fixed with a pressure ring 4b or the like. The straight advance barrel 3 is fitted to an outer circumference of the fixed barrel 1 to be freely movable, and further includes three key members (not shown) in a circumferential direction to be engaged with straight grooves formed on the outer circumference of the fixed barrel 1 and hence be held to be freely movable straightforward in the optical axis direction. Then, the straight advance barrel 3 has a first unit cam 3a having a bottom in an inner circumference thereof as illustrated in FIG. 4, with which a roller 2a provided to an outer circumference at a distal end of the zoom cam ring 2 is engaged.

In this manner, with the rotation of the zoom cam ring 2, the straight advance barrel 3 is configured to move straightforward in a U-turn manner along a locus of the first unit cam 3a. The first lens barrel 4 has the rollers 4a thereof adjusted in position in the optical axis direction to be fixed by cam grooves 3b having lifts of the straight advance barrel 3, but is configured to move integrally with the straight advance barrel 3.

2) In Regard to Second Lens Unit L2 and Third Lens Unit L3

Figure 7:
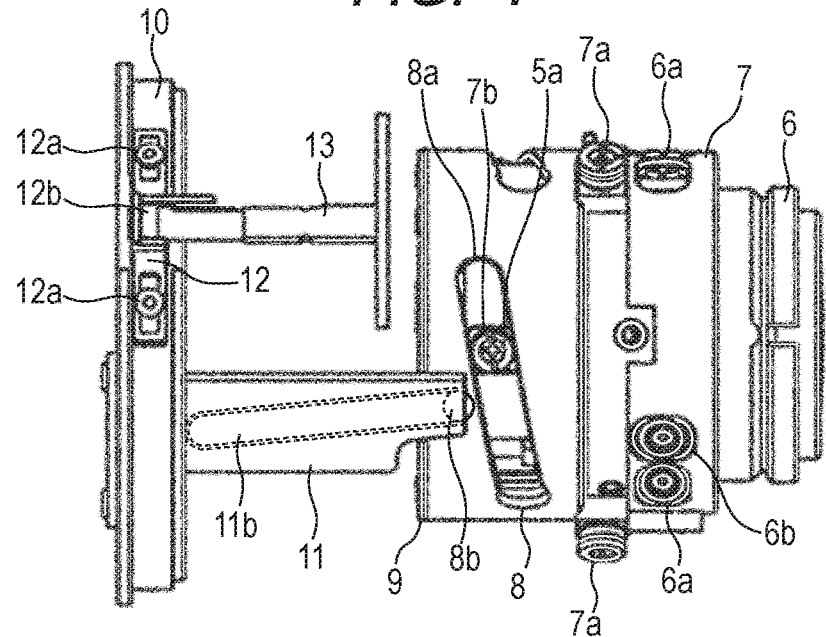
FIG. 7 is a main part projection view for illustrating a movement of a second lens barrel of the zoom lens barrel according to the embodiment of the present invention in a wide angle and infinity state.
Figure 8:
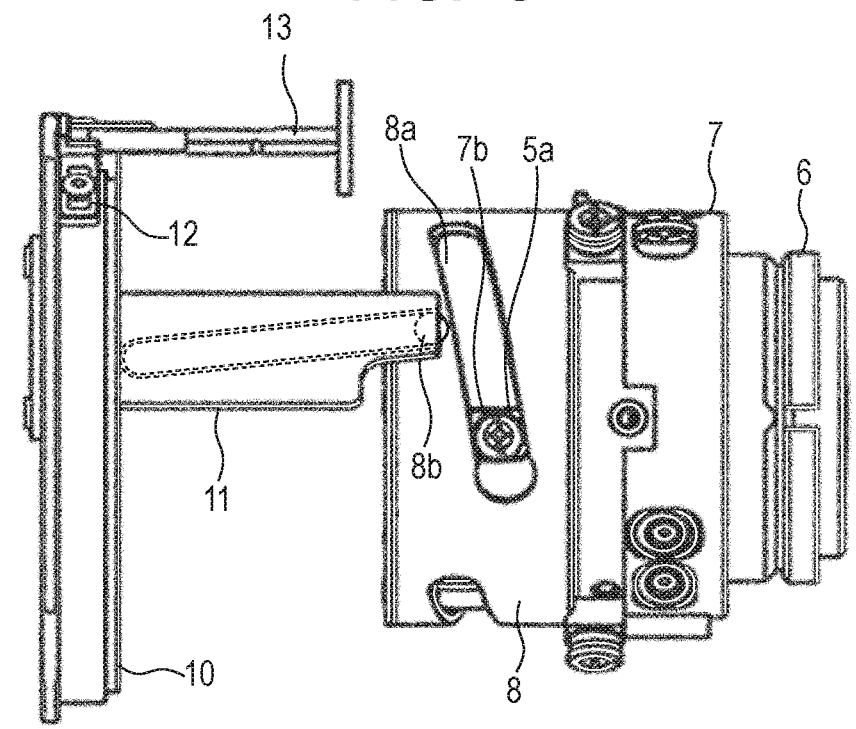
FIG. 8 is a main part projection view for illustrating a movement of the second lens barrel of the zoom lens barrel according to the embodiment of the present invention in a wide angle and proximity state.
Figure 9:
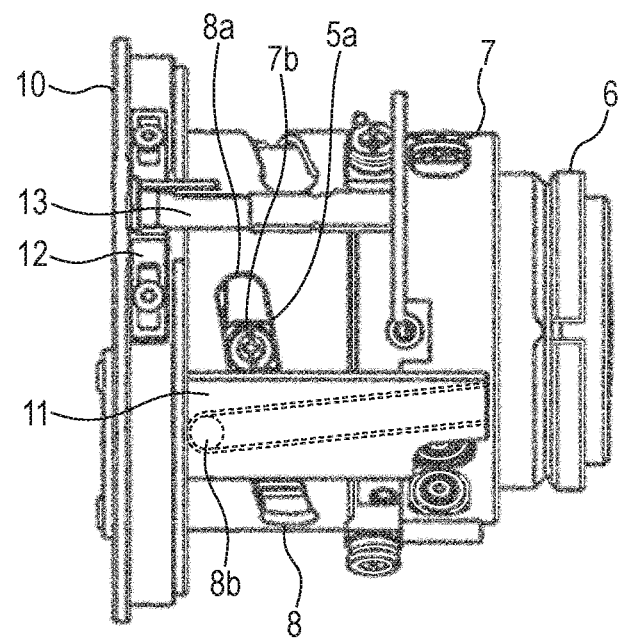
FIG. 9 is a main part projection view for illustrating a movement of the second lens barrel of the zoom lens barrel according to the embodiment of the present invention in a telephoto and infinity state.
Figure 10:
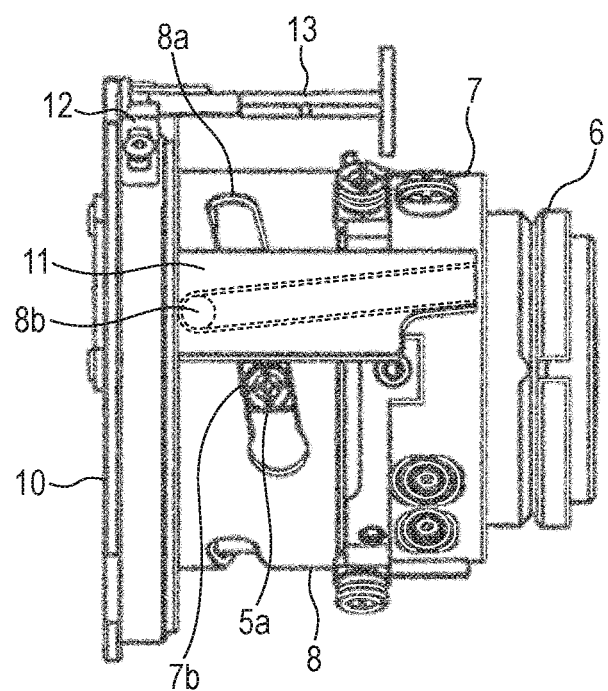
FIG. 10 is a main part projection view for illustrating a movement of the second lens barrel of the zoom lens barrel according to the embodiment of the present invention in a telephoto and proximity state.

In FIG. 1, a second lens barrel (focus lens frame) 5 holds the second lens unit L2 as a lens unit. Similarly, a third lens barrel 6 holds the third lens unit L3 as a lens unit. A third unit base frame 7 serving as the zoom lens frame holds the third lens barrel 6 with a plurality of rollers 6a and 6b (FIG. 7). The rollers 6a and 6b are intended to respectively adjust eccentricity and inclination of the third lens barrel 6 to be fixed to the third unit base frame 7, which is a well-known technology, and a description thereof is omitted here.

The third unit base frame 7 serving as the zoom lens frame holds rollers 7a at three equally spaced positions in an outer circumference thereof, and the rollers 7a are engaged with the straight grooves of the fixed barrel 1 and third unit cams of the zoom cam ring 2. Therefore, with the rotation of the zoom cam ring 2 during zooming, the third lens barrel 6 is configured to move integrally with the third unit base frame 7 and straightforward in the optical axis direction.

In this example, to the outer circumference of the third unit base frame 7, a focus cam ring 8 is fitted to be freely rotatable. More specifically, the focus cam ring 8 is held by a pressure plate 9, which is fixed with screws to a front end (object side) of the third unit base frame 7, to be freely rotatable only at a fixed position with respect to the third unit base frame 7.

The focus cam ring 8 has focus cam grooves 8a (FIG. 6) formed thereon at three equally spaced positions in the circumferential direction, with which three rollers 5a (FIG. 7) provided to the second lens barrel 5 are engaged. The rollers 5a are also engaged with straight grooves 7b formed on the third unit base frame 7, and the second lens barrel 5 is driven straightforward in the optical axis direction with the rotation of the focus cam ring 8. In this manner, the second lens barrel 5 is configured to move independently in the optical axis direction during focusing to perform focus adjustment.

3) Focusing

In FIG. 1, a rotation ring 10 is fitted to an inner circumference of the fixed barrel 1 with a diameter fitting portion 10a, and is held to be freely rotatable at a fixed position with a bayonet portion 10b being engaged with a bayonet groove 1b of the fixed barrel 1. To the rotation ring 10, a focus key 11 serving as a key member configured to transmit torque to the focus cam ring 8 is fixed with screws 11a.

Figure 5:
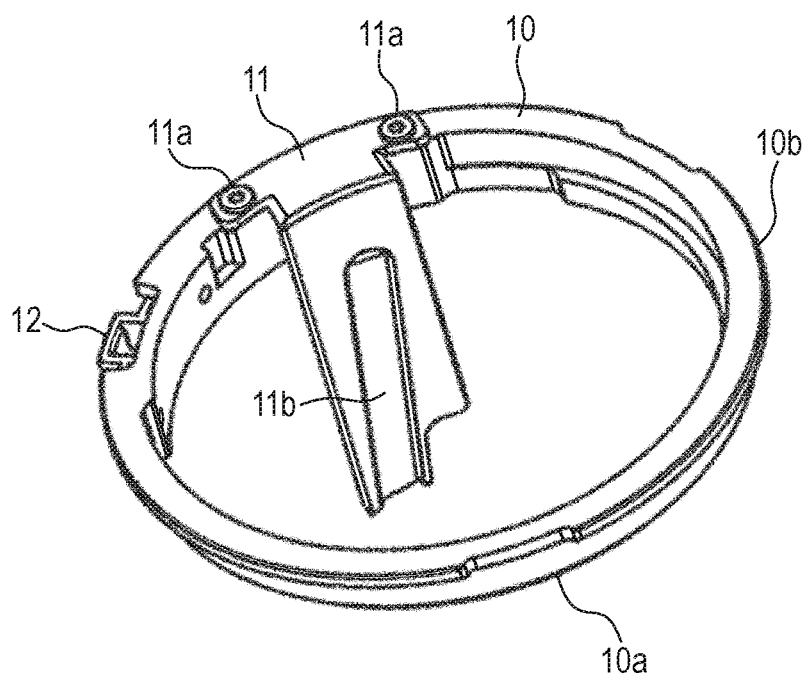
FIG. 5 is a main part perspective view for illustrating a rotation ring and a focus key of the zoom lens barrel according to the embodiment of the present invention.
Figure 6:
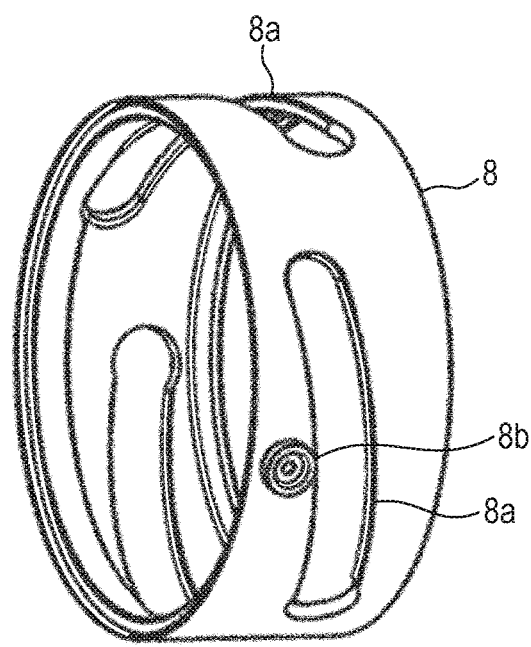
FIG. 6 is a main part perspective view for illustrating a focus cam ring of the zoom lens barrel according to the embodiment of the present invention.

Then, to the focus cam ring 8, a roller 8b, which serves as a cam follower, is mounted as the first rotation transmission portion. On the other hand, in an inner circumference of the focus key 11, a cam groove 11b, which is not in parallel to an optical axis, is formed as the second rotation transmission portion, and the roller 8b and the cam groove 11b are engaged with each other. With those elements, when the rotation ring 10 rotates, the focus cam ring 8 rotates by the same angle via the focus key 11 (FIGS. 5 and 6).

Meanwhile, an adjustment plate 12 (FIG. 5) is fixed to the rotation ring 10 with screws 12a (FIG. 7), and a drive plate 13 (FIG. 7), which is fixed to a rotor portion of a focus motor (not shown), is engaged with a groove portion 12b (FIG. 7) of the adjustment plate 12. The drive plate 13 transmits a driving force of the focus motor or a manual focus ring to rotate the rotation ring 10, and rotate the focus cam ring 8, which is coupled to the second lens barrel 5, via the focus key 11 during focusing. In this manner, the second lens unit L2 may be moved in the optical axis direction to perform the focus adjustment.

4) Zooming

Next, a zoom driving mechanism according to this embodiment is described. FIG. 11 is a diagram for illustrating driving loci of the zoom lens according to this embodiment. In FIG. 11, during zooming from a wide angle end to a telephoto end, the respective lens units are configured to move as in FIG. 11. In FIG. 11, the left side is the object side. The second unit (second lens unit L2) is a lens unit configured to move during zooming and focusing, and a position thereof in proximity is indicated by the dotted line. At each zoom position, the movement amounts from infinity to proximity are the same.

Figure 12:
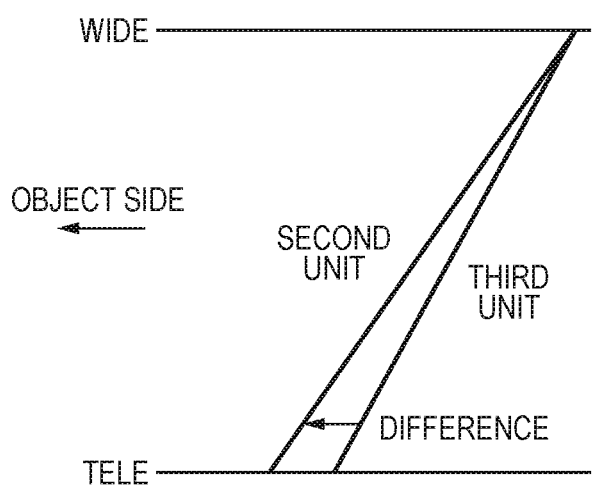
FIG. 12 is a diagram for illustrating a movement amount difference between a second lens unit and a third lens unit in the zoom lens barrel according to the embodiment of the present invention.
Figure 13:
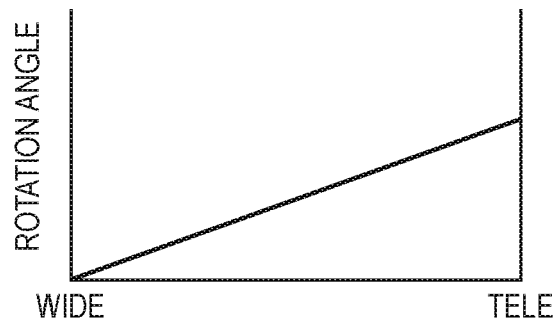
FIG. 13 is a graph for showing a rotation angle of the focus cam ring during zooming of the zoom lens barrel according to the embodiment of the present invention.

A difference between the movement amounts of the second unit (second lens unit L2) and the third unit (third lens unit L3) is small during zooming, and FIG. 12 is a diagram for illustrating the difference between the movement amounts of (movement amount difference between) the second unit (second lens unit L2) and the third unit (third lens unit L3) during the movements from the wide angle end to the telephoto end. In a case where the movement of the third unit (third lens unit L3) is linear, the movement of the second unit (second lens unit L2) is also linear. When it is assumed that the difference (movement amount difference) at the wide angle end is zero, it can be seen that the difference (movement amount difference) is proportional to the movement amount of the third unit. In other words, in this embodiment, a design in which the movement amounts of the second unit (second lens unit L2) and the third unit (third lens unit L3) are changed proportionally during zooming is adopted.

Therefore, in this embodiment, the movement of the second unit (second lens unit L2) during zooming is realized so as to be proportional to the movement amount of the third unit (third lens unit L3) by rotating the focus cam ring 8 in proportion to a zoom change. More specifically, in FIG. 13, a rotation angle of the focus cam ring 8 during zooming is shown. In the case where the movement amount of the third unit is linear, the rotation angle of the focus cam ring 8 is also expressed as being linear. When such a configuration is adopted, the cam groove of the focus key 11 is linear, which is easy to manufacture.

In this manner, when the third unit (third lens unit L3) is moved in the optical axis direction during zooming, the second unit (second lens unit L2) is also moved in the optical axis direction accordingly at the same time. At this time, the focus cam ring 8 rotates with a slope of the cam groove 11b formed on the focus key 11. Then, a position of use of each of the focus cam grooves 8a in the focus cam ring 8 is changed, with the result that the second lens barrel 5 is moved in the optical axis direction with respect to the third lens barrel 6.

Figure 14:
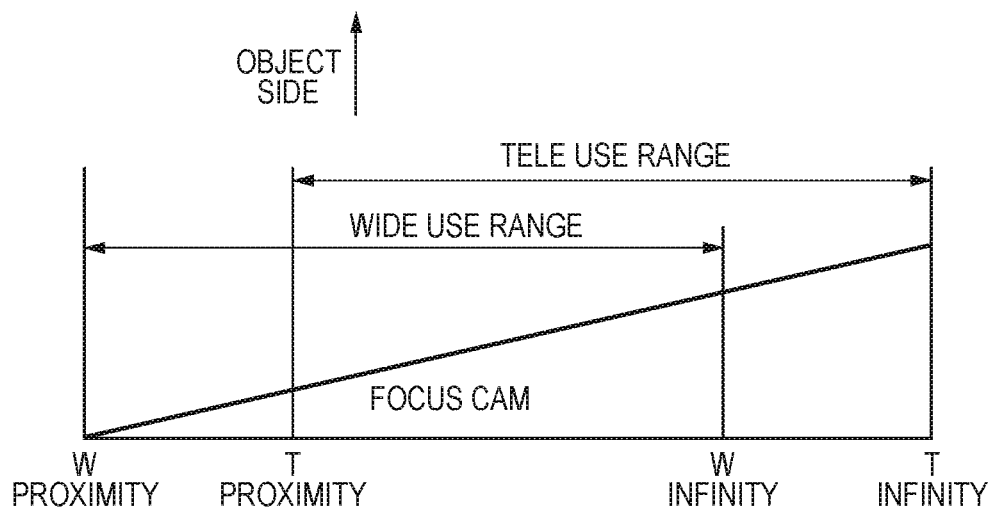
FIG. 14 is a diagram for illustrating a range of use of a focus cam groove at a wide angle end and a telephoto end of the zoom lens barrel according to the embodiment of the present invention.

FIG. 14 is a diagram for illustrating the position of use of each of the focus cam grooves 8a on the focus cam ring 8, and each of the focus cam grooves 8a is configured to move in the right and left direction in FIG. 14 with the rotation. At each zoom position, although the movement amount, that is, an angle of use of the cam groove from infinity to proximity is the same during the focus adjustment, a range of use of the cam groove is changed to move the difference from the third unit during zooming.

Note that, in this embodiment, the adjustment plate 12 (FIGS. 5 and 7) has an elongated screw hole to be adjusted in an angular direction to be mounted on the rotation ring 10. In this manner, a shift in focus position at infinity, which is generated by manufacturing errors of the parts, may be adjusted.

Each of FIG. 7 to FIG. 10 is a view for illustrating an infinity or proximity state at each zoom position. In FIGS. 7, 8, 9 and 10, a wide angle and infinity state, a wide angle and proximity state, a telephoto and infinity state, and a telephoto and proximity state are illustrated, respectively. It can be seen that points of use of the cam groove 11b of the focus key 11 and the roller 8b of the focus cam ring 8 are relatively changed in the optical axis direction during zooming.

Moreover, the positions of the cam groove 11b of the focus key 11 and the roller 8b of the focus cam ring 8 do not change at the same zoom position, from which it can be seen that the rotation ring 10 and the focus cam ring 8 rotate integrally. It can also be seen that a range of use of each of the focus cam grooves 8a from infinity to proximity at each zoom position is changed.

Effects of this Embodiment

As described above, according to this embodiment, a cam for zoom driving of the focus lens unit is not required, with the result that the total length of the zoom cam ring 2 may be reduced, and hence the entire zoom lens may be downsized. Moreover, the focus lens unit is driven integrally with the other zoom lens units, and the difference from the other lens units is realized by rotating the focus cam ring 8, which is configured to move integrally with the other zoom lens units. Therefore, there is no need to add a new focus cam ring that is driven independently, and a space-saving and compact lens barrel may be realized.

In other words, a difference in motion between the second unit and the third unit during zooming is generated by rotating the focus cam ring 8, which is configured to drive the second unit. The downsizing of the zoom lens may be realized because less space is required in the optical axis direction than to form cam grooves for the second unit and the third unit in the zoom cam ring 2. That is to say, the downsizing of the zoom lens may be realized because the plurality of cam grooves formed on the zoom cam ring are engaged with the plurality of rollers provided to the zoom lens frame, respectively, in other words, the zoom cam ring does not have a cam groove for moving the focus cam ring in the optical axis direction. Moreover, in comparison to a case where the focus cam ring is driven along with rotational driving of the zoom cam ring, the structure is simpler, and the focus lens unit is not rotated and extended but may be driven straightforward, which leads to an effect of having a flexibility in arranging a stop and other such parts.

Moreover, the effects are large in a case of an optical system in which the difference between the movement amounts of the second unit and the third unit during zooming is small, but the effects of this embodiment may be obtained also in a case where it is optically more advantageous when directions of tilt and eccentricity, which occur due to backlash or deformation, are shifted in the same direction for the second unit and the third unit. Moreover, in this embodiment, the number of cam grooves for movable units may be reduced, and hence a cam groove for another movable unit may be formed in the zoom cam ring 2 (for example, the stop may be moved).

Moreover, according to this embodiment, a transmission portion of the focus cam ring includes the cam follower and the cam grooves, with the result that stable performance may be provided with a simple structure.

MODIFIED EXAMPLE

The exemplary embodiment of the present invention is described above, but the present invention is not limited to the embodiment and can be modified and changed variously within the scope of the gist thereof.

Modified Example 1

In the above-mentioned embodiment, such an optical design is adopted in which the movement of the second unit (second lens unit L2) with respect to the third unit (third lens unit L3) during zooming is in a proportional relationship, that is, in a case where the movement of the third unit (third lens unit L3) is realized by moving the third unit (third lens unit L3) with a linear cam, the movement of the second unit (second lens unit L2) is also linear. However, in a case where the movements are not in a proportional relationship to each other, that is, the second unit (second lens unit L2) or the third unit (third lens unit L3) needs to be moved with a non-linear cam, the cam groove 11b of the focus key 11 may be non-linear.

Moreover, in a case where a drive amount for focal point adjustment is different for the wide angle end and the telephoto end, it can also be contemplated to form non-linear focus cam grooves 8a on the focus cam ring 8. Further, the cam groove 11b of the focus key 11 may be tapered so that the focus key 11 may be formed in a mold. In that case, the cam follower (roller 8b) side may also be tapered.

Modified Example 2

Moreover, in the above-mentioned embodiment, the cam groove 11b is formed on the focus key 11, and the roller 8b is provided to the focus cam ring 8 to form a torque transmission structure. This is because the structure has a history of being processed, the backlash may be adjusted by changing a diameter of the roller, and hence the structure may maintain more stable performance. However, the present invention is not limited to this structure, and the focus key 11 may be formed of an end cam, a concave portion or a convex portion to engage with the end cam may be formed on the focus cam ring 8 side, and a biasing structure may be formed so that the focus cam ring 8 is always in contact with the end cam.

Modified Example 3

Moreover, in the above-mentioned embodiment, the zoom lens configured to take the still image and the moving image has been described, but similar effects may be obtained in a zoom lens barrel configured to perform zooming and focus adjustment, such as a projection lens for a projector or the like, or an imaging optical system for a copying machine or the like, and in an optical apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-004029, filed Jan. 13, 2015, which is hereby incorporated by reference herein in its entirety.

What is claimed is:

1. A zoom lens barrel, comprising:
   a focus lens frame configured to move in an optical axis direction during zooming and focusing;
   a focus cam ring configured to rotate to move the focus lens frame in the optical axis direction;
   a key member configured to rotate to transmit torque to the focus cam ring;
   a zoom lens frame configured to move in the optical axis direction along with the focus cam ring;
   a zoom cam ring configured to rotate to move the zoom lens frame in the optical axis direction;
   a first rotation transmission portion provided to the focus cam ring; and
   a second rotation transmission portion provided to the key member to be engaged with the first rotation transmission portion,
   wherein a plurality of cam grooves formed on the zoom cam ring are engaged with a plurality of rollers provided to the zoom lens frame, respectively,
   wherein the focus lens frame is configured to move in the optical axis direction when the focus cam ring rotates with the rotation of the key member during focusing, and the focus lens frame is configured to move in the optical axis direction along with the zoom lens frame when the focus cam ring rotates with a change in relative positions of the first rotation transmission portion and the second rotation transmission portion in the optical axis direction and a rotational direction during zooming, and
   wherein the first rotation transmission portion comprises a cam follower, and the second rotation transmission portion comprises a cam groove, which is not in parallel to the optical axis.

2. The zoom lens barrel according to claim 1,
   wherein the zoom lens barrel holds, in order from an object side, a first lens unit, a second lens unit, and a third lens unit as lens units,
   wherein the first lens unit, the second lens unit, and the third lens unit are configured to move in the optical axis direction so that an interval between each pair of adjacent lens units is changed during zooming,
   wherein the second lens unit is configured to move in the optical axis direction during focusing, and is held by the focus lens frame, and
   wherein the zoom cam ring is configured to rotate to move the first lens unit, the second lens unit, and the third lens unit in the optical axis direction during zooming.

3. The zoom lens barrel according to claim 2,
   wherein during zooming from a wide angle end to a telephoto end, a difference between a movement amount of the second lens unit and a movement amount of the third lens unit is proportional to the movement amount of the third lens unit, and
   wherein the difference between the movement amount of the second lens unit and the movement amount of the third lens unit is generated by the rotation of the focus cam ring.

4. The zoom lens barrel according to claim 2, further comprising:
   a third lens frame configured to hold the third lens unit; and
   wherein the zoom cam ring is configured to be rotated to move the third lens frame and the zoom lens frame in the optical axis direction.

5. The zoom lens barrel according to claim 2,
   wherein the focus lens frame comprises a second lens frame configured to hold the second lens unit,
   wherein the focus cam ring has a plurality of focus cam grooves formed at different positions when viewed in the optical axis direction, and wherein the second lens frame includes a plurality of rollers configured to be engaged with the plurality of focus cam grooves, respectively.

6. The zoom lens barrel according to claim 1, wherein the focus cam ring is fitted to an outer circumference of the zoom lens frame to be freely rotatable.

7. An optical apparatus, comprising:
a camera body; and
a zoom lens barrel,
wherein the zoom lens barrel comprises:
  a focus lens frame configured to move in an optical axis direction during zooming and focusing;
  a focus cam ring configured to rotate to move the focus lens frame in the optical axis direction;
  a key member configured to rotate to transmit torque to the focus cam ring;
  a zoom lens frame configured to move in the optical axis direction along with the focus cam ring;
  a zoom cam ring configured to rotate to move the zoom lens frame in the optical axis direction;
  a first rotation transmission portion provided to the focus cam ring; and
  a second rotation transmission portion provided to the key member to be engaged with the first rotation transmission portion,
wherein a plurality of cam grooves formed on the zoom cam ring are engaged with a plurality of rollers provided to the zoom lens frame, respectively,
wherein the focus lens frame is configured to move in the optical axis direction when the focus cam ring rotates with the rotation of the key member during focusing, and the focus lens frame is configured to move in the optical axis direction along with the zoom lens frame when the focus cam ring rotates with a change in relative positions of the first rotation transmission portion and the second rotation transmission portion in the optical axis direction and a rotational direction during zooming, and
wherein the first rotation transmission portion comprises a cam follower, and the second rotation transmission portion comprises a cam groove, which is not in parallel to the optical axis.

8. The zoom lens barrel according to claim 1,
wherein the cam groove is not in parallel to the optical axis direction on an inner circumference of the key member.

9. The zoom lens barrel according to claim 1,
wherein an engagement range between the focus lens frame and the focus cam ring is changed by rotating the focus cam ring according to the change in relative positions of the first rotation transmission portion and the second rotation transmission portion in the optical axis direction and the rotational direction during zooming.

* * * * *